(12) United States Patent
Dony

(10) Patent No.: US 6,305,352 B1
(45) Date of Patent: Oct. 23, 2001

(54) METHOD FOR DETECTING AN ABNORMAL DISTURBANCE OF AN INTERNAL COMBUSTION ENGINE TORQUE

(75) Inventor: Guillaume Dony, Arpajon (FR)

(73) Assignee: Renault, Boulogne Billancourt (FR)

( * ) Notice: Subject to any disclaimer, the term of this patent is extended or adjusted under 35 U.S.C. 154(b) by 0 days.

(21) Appl. No.: 09/486,709

(22) PCT Filed: Sep. 4, 1998

(86) PCT No.: PCT/FR98/01895

§ 371 Date: May 16, 2000

§ 102(e) Date: May 16, 2000

(87) PCT Pub. No.: WO99/13310

PCT Pub. Date: Mar. 18, 1999

(30) Foreign Application Priority Data

Sep. 5, 1997 (FR) .................................................. 97 11052

(51) Int. Cl.[7] .................................................. G01M 15/00
(52) U.S. Cl. .................................................. 123/406.27; 701/111
(58) Field of Search .................... 123/406.2, 406.23, 123/406.24, 406.27; 701/110, 111; 73/117.3, 118

(56) References Cited

U.S. PATENT DOCUMENTS

| | | | |
|---|---|---|---|
| 5,237,862 | * | 8/1993 | Mangrulkar et al. .................. 73/116 |
| 5,239,473 | * | 8/1993 | Ribbens et al. ....................... 701/111 |
| 5,278,760 | * | 1/1994 | Ribbens et al. ....................... 701/111 |
| 5,440,921 | * | 8/1995 | Matsumo et al. .................... 73/117.3 |
| 5,505,079 | * | 4/1996 | Rossignol ............................ 73/117.3 |
| 5,528,931 | * | 6/1996 | James et al. ......................... 73/117.3 |

* cited by examiner

Primary Examiner—Henry C. Yuen
Assistant Examiner—Hieu T. Vo
(74) Attorney, Agent, or Firm—Oblon, Spivak, McClelland, Maier & Neustadt, P.C.

(57) ABSTRACT

A method for detecting an abnormal disturbance of an internal combustion engine torque and for suspending the functioning of a system in which combustion misfiring has been diagnosed. The method operates by analysis of values of a quantity representing the quality of combustion by observing engine crank shaft rotation. A stability criterion is defined of the quantity for each of the engine cylinders. Then, after each combustion the stability criterion is compared with a predetermined threshold, and an abnormal torque disturbance is detected when the stability criterion is greater than the threshold for a given number of consecutive times for at least one cylinder.

10 Claims, 3 Drawing Sheets

METHOD FOR DETECTING AN ABNORMAL DISTURBANCE OF AN INTERNAL COMBUSTION ENGINE TORQUE

BACKGROUND OF THE INVENTION

1. Field of the Invention

The present invention relates to a process for detection of an abnormal perturbation of the torque of an internal combustion engine, especially one mounted in a motor vehicle. The present invention relates more particularly to a process capable of suspending the diagnosis of misfires when abnormal perturbations caused in particular by rough roadway pavement or by any other factor create excessive noise in the signal used for diagnosis of misfires.

2. Discussion of the Background

In the scope of antipollution regulations such as the American OBD standards (On Board Diagnostics), it is required that electronic engine control systems of motor vehicles must be able to diagnose certain engine dysfunctions which influence pollutant emissions.

For this reason it is planned, for future electronic engine control systems, to install systems capable of diagnosing proper operation of the oxygen sensor or of the EGR loop (exhaust gas recirculation), wherein recognition of a malfunction which affects pollutant emissions must trip activation of less intensive modes of operation and/or must turn on a light on the dashboard to warn the driver (relaxed regulations) or must stop the vehicle (strict regulations).

In particular, the American and European standards provide for requiring detection of misfires and for identification of the cylinder or cylinders responsible. Such detection must, for example, furnish the percentage of misfires occurring in a given number of engine cycles.

The equipment designers and automobile manufacturers have therefore developed a certain number of techniques for detection of misfires.

As an example, there can be cited the accelerometer method, which comprises detecting a misfire by analysis of the variation of longitudinal acceleration of the vehicle, or the method using an oxygen-proportional sensor disposed in the exhaust line. There can also be cited the method using pressure sensors communicating with the combustion chambers, or that based on measurement of arc voltage or ionization current of the spark plugs (for controlled ignition engines).

The most commonly used method, however, is that which deduces the existence of misfires by measurement of the instantaneous speed of the crankshaft. The use thereof is actually extremely simple, since it involves merely applying software processing of the signal furnished by the angular position sensor of the crankshaft, a signal which is already used by the engine control system to control fuel injection, and so no specific equipment-related device is required for implementation of this method.

The analysis solely of the signal furnished by the crankshaft position sensor to detect possible misfires nevertheless suffers from certain disadvantages.

The method of detection of misfires is in fact based on the postulate that a misfire is manifested by a drop of the gas torque, which in turn generates a corresponding change of the instantaneous speed of the crankshaft. To identify misfires, therefore, it is sufficient to record the changes in instantaneous speed of the crankshaft.

However, the instantaneous speed of revolution of the crankshaft and of the engine flywheel integral therewith reflects not only the operation of the engine and the alternating thrust of the connecting rods under the effect of combustion of the carbureted mixture, but also the operation of the entire kinematic chain connecting the engine to the tire/ground interface.

In fact, the mechanical energy at the end of the crankshaft is transmitted to the wheels by a transmission system which traditionally comprises a clutch, a speed-change box and a differential, this transmission possessing its own damping and stiffness. As a result, therefore, any abrupt variation of torque involving any of the elements of the kinematic chain, such as, for example, involving the vehicle's wheels because of poor condition of the roadway surface, is fed back to the crankshaft in the form of oscillations, the magnitude of which will depend on the characteristics of the transmission system and of the perturbation.

As a result, the abrupt changes in instantaneous speed of the crankshaft are therefore caused not solely by misfires but also by all the perturbations capable of affecting the kinematic transmission chain, and therefore especially a roadway in poor condition.

For correct and exclusive identification of misfires, therefore, it seems important to be able to distinguish, among the changes of crankshaft speed, those due effectively to drops of gas torque from those having other causes, so that the latter are not counted.

To achieve this, additional strategies for deactivation of the program for detection of misfires have been developed, which strategies are based on recognition of perturbations affecting the kinematic transmission chain. Thus there can be cited strategies which use the information of wheel speed furnished by a specific sensor or else those requiring an accelerometer. There can also be cited the method described in British Patent GB A 2290870, which attempts to identify such perturbations by fuel motion in the fuel tank.

It nevertheless appears at present that none of the proposed methods is capable of distinguishing, in simple and economic fashion and with sufficient precision and reliability, the changes of crankshaft speed caused by perturbations which affect the kinematic transmission chain.

SUMMARY OF THE INVENTION

The object of the present invention is therefore to improve the process described in the foregoing by providing a process for detection of abnormal torque perturbations other than those related to true misfires, which process is capable of temporarily suspending the diagnosis of misfires.

The process for detection of an abnormal perturbation of an internal combustion engine torque and suspending the operation of a system for diagnosis of misfires is of the type that operates by analysis of the values of a variable representative of firing quality by observation of the rotation of the engine crankshaft.

According to the invention, the process for detection of an abnormal torque perturbation is characterized in that it comprises:
  defining a criterion of stability of the variable representative of firing quality for each cylinder of the engine and for each firing;
  comparing, after each firing, this stability criterion with a predetermined threshold, and detecting an abnormal torque perturbation when this stability criterion exceeds, for at least one cylinder, the threshold for a given number of consecutive times.

According to another characteristic of the process according to the invention for detecting an abnormal torque perturbation, the said variable representative of firing quality is the gas torque.

According to another characteristic of the process according to the invention for detecting an abnormal torque perturbation, the stability criterion quantifies, for a given cylinder and given firing, the absolute deviation between the value of the said variable representative of firing quality and the value of a statistical variable representative of the mean of the different values of the variable representative of firing quality, the values being measured successively over a given measurement horizon.

According to another characteristic of the process according to the invention for detecting an abnormal torque perturbation, the statistical variable representative of the mean of the different values of the variable representative of firing quality is obtained by a first-order low-pass filter with a given filtering constant.

According to another characteristic of the process according to the invention for detecting an abnormal torque perturbation, the threshold is deduced from the variations of the variable representative of firing quality observed during normal engine operation, and it therefore depends on the engine operating point.

According to another characteristic of the process according to the invention for detecting an abnormal torque perturbation, the firings being diagnosed as misfires initiate a particular treatment in the calculation of the stability criterion.

According to another characteristic of the process according to the invention for detecting an abnormal torque perturbation, the firings being diagnosed as misfires initiate a particular treatment in the comparison of the stability criterion with the predetermined threshold.

BRIEF DESCRIPTION OF THE DRAWINGS

The objectives, aspects and advantages of the present invention will be better understood from the description presented hereinafter of different embodiments of the invention, given as non-limitative examples, with reference to the attached drawings, wherein.

DESCRIPTION OF THE PREFERRED EMBODIMENTS

Figure 1:
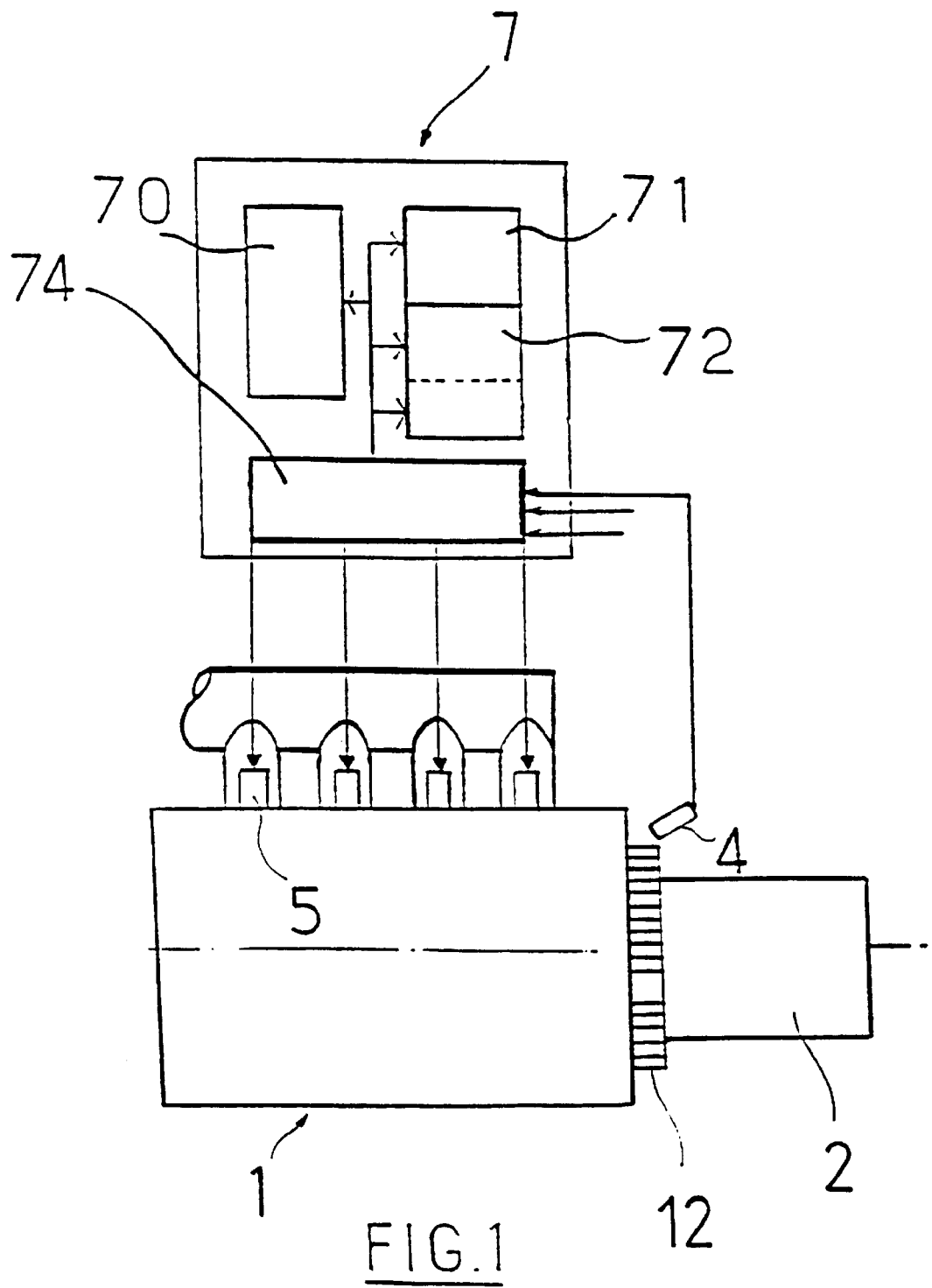
FIG. 1 is a partial view of an internal combustion engine equipped with an engine control system permitting use of the process according to the invention.

Referring to FIG. 1, there can be seen a simplified sketch of an engine control system using the process according to the present invention for detecting misfires. Only the constituent parts necessary for understanding of the invention have been shown.

Internal combustion engine 1 is designed more particularly as equipment for a motor or road vehicle. Engine 1 is connected to a transmission device suitable for transmitting motion to the vehicle's wheels. This transmission device classically comprises a clutch, a speed-change box 2 and a differential, not illustrated.

The four-cycle multi-cylinder engine 1 is equipped with a fuel-injection device of the multi-point type with electronic control, by virtue of which each cylinder is supplied with fuel from a specific electronic injector 5.

Opening of each electronic injector 5 is controlled by the electronic engine control system 7, which adjusts the quantity of fuel injected and the moment of injection into the cycle as a function of engine operating conditions, in such a way that the richness of the combustible air-fuel mixture admitted to the cylinders is adjusted automatically and precisely to a predetermined setpoint value.

The electronic engine control system 7 classically comprises a microprocessor 70, read-write memories 71, read-only memories 72, analog-to-digital converters 74 and various input and output interfaces.

Microprocessor 70 is provided with electronic circuits and software routines appropriate for processing the signals originating from suitable sensors, for determining the states of the engine and for initiating predefined operations in order to generate control signals destined in particular for the injectors (and for the ignition coils in the case of a controlled ignition engine), so as to ensure optimum management of the firing conditions in the engine cylinders.

The input signals of microprocessor 70 include in particular those addressed by a crankshaft sensor 4. This sensor 4, of the variable reluctance type, for example, is mounted immovably on the engine frame at a position in front of a measuring gear 12 fixed to one end of the crankshaft.

This gear 12 is provided on its periphery with a succession of teeth and spaces, which are identical with the exception of one tooth, which has been removed in order to define an absolute reference with which there can be deduced the moment at which a given reference cylinder, in the present case cylinder No. 1, passes top dead center.

Sensor 4 delivers a signal Dn corresponding to the procession of the teeth of gear 12, which signal is processed to generate a TDC signal during each half-revolution of the crankshaft, thus making it possible to identify in alternation the passes of cylinders No. 1, 3, 4, 2 through top dead center.

Processing of signal Dn emitted by sensor 4 also makes it possible to measure the speed of procession of the teeth of gear 12, and thus to record the instantaneous speed of revolution of the engine.

Microprocessor 70 therefore transforms signal Dn to produce a representative variable characteristic of the quality of firings occurring in each of the engine cylinders and to perform the diagnosis of misfires according to a process known in itself, which will not be described in detail since it is not the object of the present invention.

The representative variable characteristic of firing quality can be, for example, the instantaneous crankshaft acceleration (see German Patent Applications DE 3939113 or DE 4002208), or else the torque, the value of which is obtained by spectral analysis of the instantaneous crankshaft speed (see French Patent Applications No. 91/11273 and 91/11274 filed by the Applicant in relation to a "process and device for measuring the gas torque of an internal combustion heat engine").

According to the embodiment described below, the gas torque Cg is the representative variable chosen to control both the system for diagnosis of misfires and the system capable of suspending the diagnosis of misfires when perturbations external to engine operation are interfering with this diagnosis.

During operation of the engine, appropriate calculating means activated by microprocessor 70 therefore furnish successive torque values $Cg,n,i$ to characterize the value of the gas torque Cg corresponding to the n-th firing of cylinder No. i.

These values are then processed by first calculation means designed to perform the diagnosis of misfires and by second calculation means, specific to the present invention, designed to identify the occurrence of torque perturbations capable of falsifying the diagnosis of misfires, which perturbations are due, for example, to the transmission device and in particular to the condition of the roadway pavement on which the vehicle is traveling.

According to the invention, the process for detecting the occurrence of torque perturbations capable of falsifying the diagnosis of misfires is performed by analysis of the torque variations cylinder by cylinder. In the practical example described hereinafter, it is sufficient to detect the occurrence of torque perturbations in a single cylinder in order to suspend the diagnosis of misfires for all cylinders.

Quite obviously it can be provided, in alternative embodiments, that the occurrence of torque perturbations in a single cylinder suspends the diagnosis of misfires only for the cylinder in question, or else it can be provided that the occurrence of torque perturbations must be detected in a predetermined number of cylinders in order to suspend the diagnosis of combustion misfires for all cylinders.

Similarly, in the event of detection of abnormal torque perturbations, inhibition of the diagnosis of misfires can be tripped immediately thereafter or can even be effected retroactively on a given period preceding the detection of the perturbations, in order to allow for the response time, the length of which depends on the chosen embodiment of the process for detection of perturbations.

In the process according to the invention, therefore, the first step is calculation of a statistical variable $MCg,n,i$ representative of the mean of the different torque values measured successively on cylinder No. i over a given horizon of torque measurements.

Calculation of the statistical variable $MCg,n,i$ is achieved, for example, by a first-order low-pass filter with given filtering constant $\tau$. In this case, statistical value $MCg,n,i$ for any new torque value $Cg,n,i$ is determined from the previously calculated statistical value, $MCg,n-1,i$, on the basis of the following recurrence formula:

$$MCg,n,i = MCg,n-1,i + ((Cg,n,i - (MCg,n-1,i))/\tau)$$

The value thus calculated from the statistical variable $MCg,n,i$ representative of the mean of the different torque values $Cg,n,i$ measured successively for cylinder No. 1 over a given horizon of torque measurements is then used to determine the value $ECg,n,i$, defined as the absolute deviation between the torque value $Cg,n,i$ and the statistical value $MCg,n,i$:

$$ECg,n,i = |MCg,n,i - cg,n,i|$$

This deviation $ECg,n,i$ is therefore representative of the engine torque variations for the cylinder in question and therefore of the stability of this torque.

In an alternative embodiment, $ECg,n,i$ can also be obtained, not from the value $MCg,n,i$, but instead from the value $MCg,n-1,i$ calculated in the preceding cycle, specifically in order to calculate $ECg,n,i$ more rapidly. This yields:

$$ECg,n,i = |Mcg,n-1,i - Cg,n,i|$$

In an alternative embodiment of the process according to the invention, it is also possible to eliminate from the calculation of $MCg,n,i$ the effect of misfires which occurred during the observed period and which were detected by the said first calculation means. For this purpose, the torque value corresponding to a misfire is replaced in the calculation of the statistical variable $MCg,n,i$ by the last value that did not correspond to a misfire or else, by blocking the filter, to its preceding value $MCg,n,i = MCg,n-1,i$.

Quite obviously, if the cylinder continuously exhibits misfires (ignition defect, etc.), detection of abnormal perturbations is then suspended for that cylinder until the fault is cleared.

Regardless of the formula for calculating $ECg,n,i$, it is then sufficient, in order precisely to isolate the abnormal torque perturbations (rough roadway pavement, transmission jolts, etc.) capable of interfering with the diagnosis of misfires, to compare this deviation with a predetermined fixed stability threshold Sstab, which depends on the engine operating point.

The stability threshold Sstab is deduced from the maximum torque excursions encountered during normal operation. It therefore depends on the engine operating point and is obtained, for example, from the following formula:

$$Sstab = \alpha \cdot \delta Cg$$

According to this formula, $\alpha$ is a calibrated factor ($0 < \alpha < 1$) and $\delta Cg$ is the expected torque drop at the operating point. Sstab, which is listed in tables or obtained by calculation, can also evolve with aging of the engine. Of course, any other representation of the nominal torque delivered by the engine can be used instead of the torque drop.

Figure 2A:
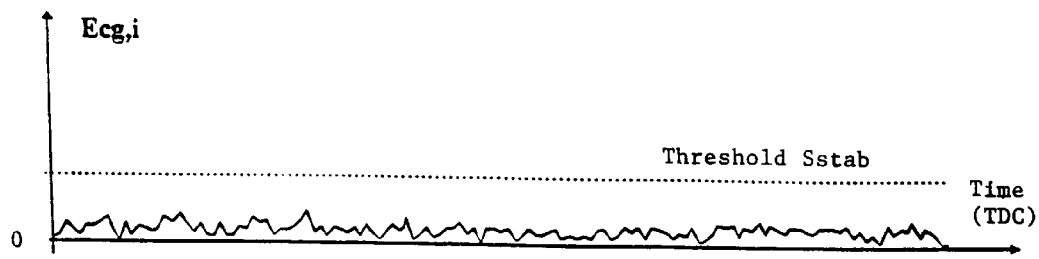
FIGS. 2a to 2c are timing diagrams indicating the principle of the process according to the invention for detection of abnormal torque perturbations.
Figure 2B:
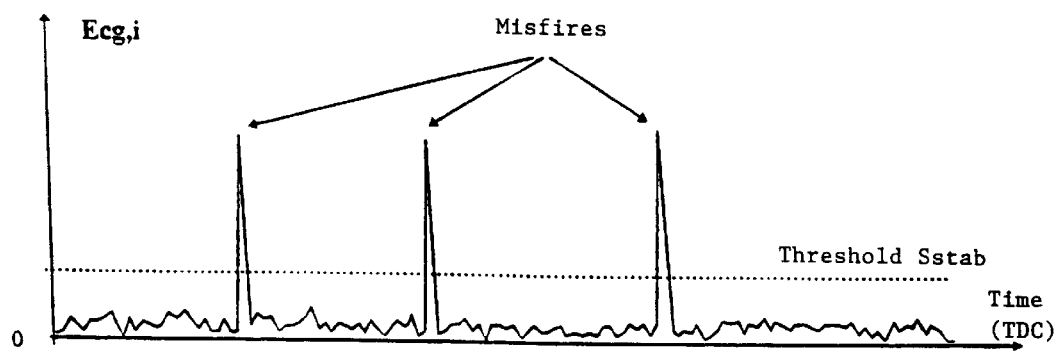
Figure 2C:
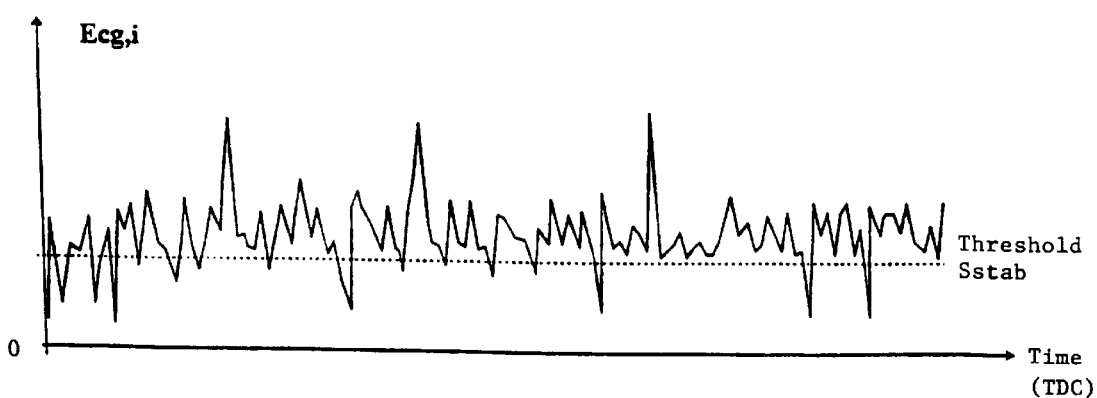

The graphs of FIGS. 2a, 2b and 2c illustrate the principle of the invention.

For stabilized engine operating conditions, when the transmission device is not subject to any large perturbation, and in the absence of misfire (FIG. 2a), the values of the gas torque $Cg,n,i$ for a given cylinder i then vary only slightly on both sides of the value $MCg,n,i$. The criterion $ECg,n,i$ then remains close to 0 and therefore is always below the threshold Sstab.

When misfires occur (FIG. 2b), the criterion $ECg,n,i$ reaches extreme values during each misfire, because the instantaneous torque $Cg,n,i$ then drops abruptly while the value $MCg,n,i$ remains at a high value, whereas for the other firings the values of gas torque $Cg,n,i$ vary only slightly on both sides of the value $MCg,n,i$ and the criterion $ECg,n,i$ then remains close to 0. Thus the threshold Sstab is exceeded only sporadically, and only during the occurrence of misfires.

In contrast, during perturbations external to cylinder operation, as in the case of poor roadway condition (see FIG. 2c), the torque $Cg,n,i$ is then randomly noisy, as is the stability criterion $ECg,n,i$, which reaches a much higher mean level. The threshold Sstab is then frequently exceeded.

It is therefore sufficient to note the frequency at which the threshold Sstab is exceeded in order to detect the occurrence of abnormal torque perturbations. For example, it is sufficient, in order to deduce the occurrence of abnormal torque perturbations, to record p consecutive overshoots of the threshold Sstab by the criterion $ECg,n,i$, where p is a natural integer greater than or equal to 2, and to suspend the diagnosis of misfires.

Nevertheless, in order not to confuse the occurrence of abnormal torque perturbations with a cylinder dysfunction which continuously generates misfires, overshoots of the threshold Sstab can be counted only in the case of a misfire.

Figure 3:
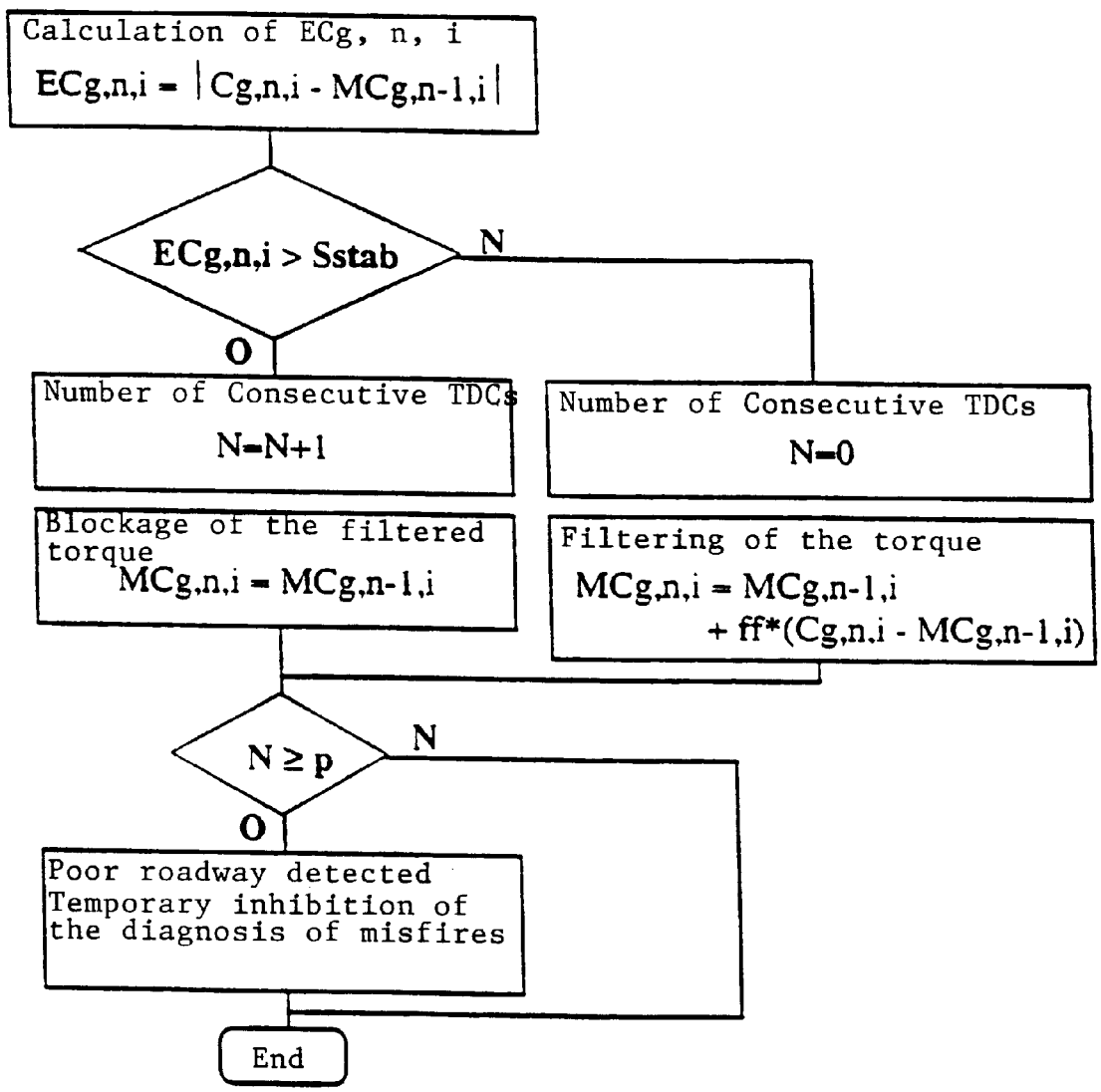
FIG. 3 is a flow chart indicating the sequence of the process according to the invention for detection of abnormal torque perturbations.

As illustrated in FIG. 3, a process according to the invention therefore comprises the following stages, which are executed after each firing indexed n and for a given cylinder No. i:

(i) acquisition of the value of the gas torque $C_{g,n,i}$ generated by firing, and calculation of the value $EC_{g,n,i}$ (using $MC_{g,n-1,i}$);

(ii) comparison of $EC_{g,n,i}$ with $S_{stab}$ if $EC_{g,n,i}$ is less than $S_{stab}$, counter N is reset to 0 (N=0);

if $EC_{g,n,i}$ is greater than or equal to $S_{stab}$, counter N is incremented by one unit (N=N+1);

(iii) at the same time, $MC_{g,n,i}$ is calculated;

(iv) comparison of N with p if the value of counter N is less than p, it is therefore assumed that abnormal torque perturbations have not been detected if, on the other hand, the value of counter N is greater than or equal to p, it is then assumed that abnormal torque perturbations have been detected, and the diagnosis of misfires is then suspended.

The described process for suspending the diagnosis of misfires therefore has the advantage of being a particularly simple and rapid method of achieving detection of abnormal torque perturbations capable of falsifying the diagnosis of misfires, without extra cost due to a component. Furthermore, this process is remarkably reliable and therefore trips inhibition of the diagnosis of misfires only when necessary.

Of course, the invention is in no way limited to the described and illustrated embodiment, which has been presented only as an example.

To the contrary, the invention comprises all technical equivalents of the described means as well as combinations thereof if they are effected in accordance with its spirit.

Thus, it is possible to operate not directly on the values $C_{g,n,i}$ but on filtered values.

As regards implementation of the device for detection of misfires, it can be achieved in diverse forms regardless of the variant chosen:

with analog electronic components, in which case the summing units, comparators and other filters are achieved by means of operational amplifiers;

or with digital electronic components, which would achieve the function by hard-wired logic;

or by a signal-processing algorithm loaded in the form of a software module, which is a component of an engine control software system for operating the microcontroller of an electronic calculator, or even by a specific (custom) chip, whose hardware and software resources will have been optimized to achieve the functions according to the invention; chip microprogrammable or not, encapsulated separately or else comprising all or part of a coprocessor implanted in a microcontroller or microprocessor, etc.

Similarly, the invention comprises all technical equivalents applied to an internal combustion engine, regardless of its combustion cycle (2-cycle, 4-cycle), of the fuel used (diesel or gasoline), or even of the number of its cylinders.

What is claimed is:

1. A process for detecting an abnormal perturbation of a torque of an internal combustion engine and suspending an operation of a system for diagnosis of misfires, which system operates by analysis of values of a variable representative of firing quality by observation of rotation of an engine crankshaft, said process comprising the steps of:

defining a criterion of stability of said variable for each cylinder of the engine and for each firing;

comparing, after each firing, the stability criterion with a predetermined threshold; and detecting an abnormal torque perturbation when said stability criterion exceeds, for at least one cylinder, the threshold for a given number of consecutive times, wherein said stability criterion quantifies, for a given cylinder and given firing, an absolute deviation between the value of said variable and the value of a statistical variable representative of a mean of different values of said variable.

2. A process for detecting an abnormal torque perturbation according to claim 1, wherein said variable representative of firing quality is a gas torque.

3. A process for detecting an abnormal torque perturbation according to claim 1, wherein the value of said variable and the value of said statistical variable are measured successively over a given measurement horizon.

4. A process for detecting an abnormal torque perturbation according to claim 3, wherein said statistical variable representative of the means of the different values of said variable is obtained by a first-order low-pass filter with a given filtering constant.

5. A process for detecting an abnormal torque perturbation according to claim 1, wherein said predetermined threshold is deduced from variations of a statistical variable observed during normal engine operation, and therefore depends on an engine operating point.

6. A process for detecting an abnormal torque perturbation according to claim 1, wherein the firings diagnosed as misfires initiate a particular treatment in the calculation of said stability criterion.

7. A process for detecting an abnormal torque perturbation according to claim 1, wherein the firings diagnosed as misfires initiate a particular treatment in the step of comparing the stability criterion with said predetermined threshold.

8. A process for detecting an abnormal perturbation of a torque of an internal combustion engine and suspending an operation of a system for diagnosis of misfires, which system operates by analysis of values of a variable representative of firing quality by observation of rotation of an engine crankshaft, said process comprising the steps of:

defining a criterion of stability of said variable for each cylinder of the engine and for each firing;

comparing, after each firing, the stability criterion with a predetermined threshold; and detecting an abnormal torque perturbation when said stability criterion exceeds, for at least one cylinder, the threshold for a given number of consecutive times, wherein said predetermined threshold is deduced from variations of a statistical variable observed during normal engine operation, and therefore depends on an engine operating point.

9. A process for detecting an abnormal perturbation of a torque of an internal combustion engine and suspending an operation of a system for diagnosis of misfires, which system operates by analysis of values of a variable representative of firing quality by observation of rotation of an engine crankshaft, said process comprising the steps of:

defining a criterion of stability of said variable for each cylinder of the engine and for each firing;

comparing, after each firing, the stability criterion with a predetermined threshold; and detecting an abnormal torque perturbation when said stability criterion exceeds, for at least one cylinder, the threshold for a given number of consecutive times,
  wherein the firings being diagnosed as misfires initiate a particular treatment in the calculation of said stability criterion.

10. A process for detecting an abnormal perturbation of a torque of an internal combustion engine and suspending an operation of a system for diagnosis of misfires, which system operates by analysis of values of a variable representative of firing quality by observation of rotation of an engine crankshaft, said process comprising the steps of:

defining a criterion of stability of said variable for each cylinder of the engine and for each firing;

comparing, after each firing, the stability criterion with a predetermined threshold; and detecting an abnormal torque perturbation when said stability criterion exceeds, for at least one cylinder, the threshold for a given number of consecutive times,
  wherein the firings being diagnosed as misfires initiate a particular treatment in the step of comparing the stability criterion with said predetermined threshold.

* * * * *